United States Patent [19]

Lipa

[11] Patent Number: 5,530,716
[45] Date of Patent: Jun. 25, 1996

[54] METHOD AND APPARATUS FOR IDENTIFYING A CODED COMMUNICATION SIGNAL

[75] Inventor: Robert A. Lipa, Aurora, Ill.

[73] Assignee: Motorola, Inc., Schaumburg, Ill.

[21] Appl. No.: 269,403

[22] Filed: Jun. 30, 1994

[51] Int. Cl.[6] .................................................. H04B 1/69
[52] U.S. Cl. ......................... 375/206; 375/202; 375/208; 370/18
[58] Field of Search ................................... 375/202, 205, 375/206, 208, 367; 370/18, 20–22, 107

[56] References Cited

U.S. PATENT DOCUMENTS

| | | | |
|---|---|---|---|
| 3,859,515 | 2/1975 | Radcliffe, Jr. | 382/281 |
| 3,956,619 | 5/1976 | Mundy et al. | 364/727 |
| 4,446,530 | 5/1984 | Tsuboka | 364/725 |
| 4,901,307 | 2/1990 | Gilhousen et al. | 370/18 |
| 5,056,109 | 10/1991 | Gilhousen et al. | 370/18 |
| 5,099,204 | 3/1992 | Wheatley, III | 330/279 |
| 5,101,501 | 3/1992 | Gilhousen et al. | 375/206 |
| 5,103,459 | 4/1992 | Gilhousen et al. | 370/18 |
| 5,107,225 | 4/1992 | Wheatley, III et al. | 330/279 |
| 5,109,390 | 4/1992 | Gilhousen et al. | 370/18 |
| 5,239,555 | 8/1993 | Konig | 375/202 |
| 5,293,434 | 3/1994 | Feig et al. | 382/234 |
| 5,305,349 | 4/1994 | Dent | 375/205 |
| 5,313,491 | 5/1994 | Schramm et al. | 375/206 |
| 5,349,606 | 9/1994 | Lovell et al. | 375/206 |
| 5,353,300 | 10/1994 | Lee et al. | 375/206 |
| 5,363,404 | 11/1994 | Kotzin et al. | 375/205 |
| 5,377,225 | 12/1994 | Davis | 375/205 |

FOREIGN PATENT DOCUMENTS 9426051  11/1994  WIPO .................................. 375/205

OTHER PUBLICATIONS

On the Capacity of a Cellular CDMA System, IEEE Transactions on Vehicular Technology, vol. 40, No. 2, May 1991, pp. 303–312.
Adaptive and Digital Signal Processing, Claude S. Lindquist, 1989 ISBN 0–917144–03–1.

*Primary Examiner*—Young T. Tse
*Attorney, Agent, or Firm*—Jeffrey G. Toler

[57] ABSTRACT

A receiver (900) employs a method (1100) for identifying a particular coded communication signal (301) from received coded communication signals (303, 305). The receiver (900) comprises a memory device (905) and a processor (907). The memory device (905) stores information contained in the received coded communication signals (303, 305) during multiple modulation symbol time intervals (210) to produce stored information. The processor (907) then searches the stored information to identify the particular coded communication signal (301).

31 Claims, 9 Drawing Sheets

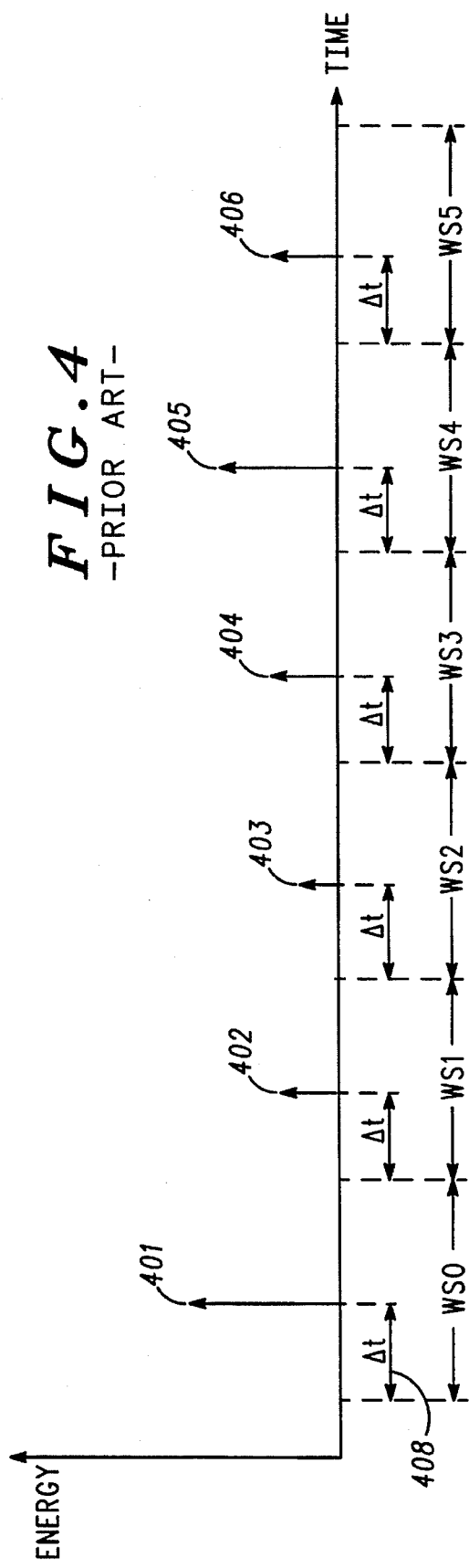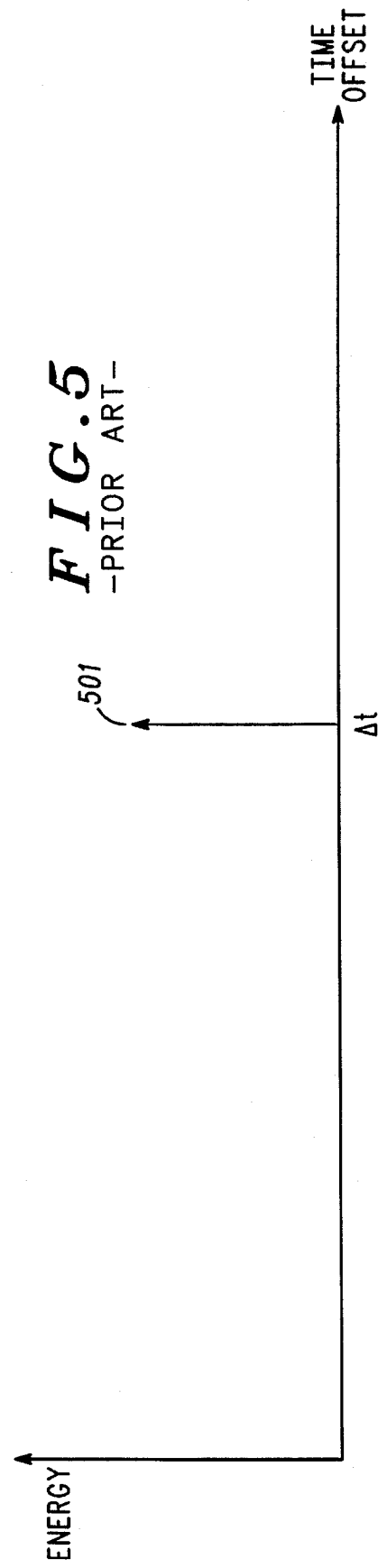

1100

METHOD AND APPARATUS FOR IDENTIFYING A CODED COMMUNICATION SIGNAL

FIELD OF THE INVENTION

The present invention relates generally to the reception of coded communication signals and, in particular, to a method and apparatus for identifying a particular coded communication from a plurality of received coded communication signals.

BACKGROUND OF THE INVENTION

Communication systems that utilize coded communication signals are known in the art. One such system is a direct sequence code division multiple access (DS-CDMA) cellular communication system, such as that set forth in the Telecommunications Industry Association/Electronic Industries Association Interim Standard 95 (TIA/EIA IS-95), hereinafter referred to as IS-95. In accordance with IS-95, the coded communication signals used in the DS-CDMA system comprise DS-CDMA signals that are transmitted in a common 1.25 MHz bandwidth to the base sites of the system from communication units, such as mobile or portable radiotelephones, that are communicating in the coverage areas of the base sites. Each DS-CDMA signal includes, inter alia, a pseudo-noise (PN) sequence associated with a particular base site and an identification number of a communicating communication unit.

During a typical communication, the communicating communication unit often travels within the coverage area of the base site that is supporting the communication. Such movement typically results in fading of the communication signal transmitted from the communication unit to the base site due to multipath propagation of the transmitted signal. As is known, multipath propagation results from reflections of the transmitted signal off of nearby scatterers, such as buildings or large stones. These reflections produce replicas of the originally transmitted signal that arrive at the base site at various times depending on the effective propagation distances traveled by the replicas. The originally transmitted signal and the multipath replicas are typically referred to as multipath signals of the originally transmitted signal.

In a DS-CDMA system, such as that described by IS-95, multipath propagation typically results in multipath signals from each transmitting communication unit arriving at the base site at substantially the same time, or at least within a common time interval. The IS-95 system divides the DS-CDMA signals into 20 millisecond (ms) frames that contain sixteen power control groups. Each power control group is further divided into six modulation-or so-called Walsh-symbol time intervals.- Each Walsh symbol time interval is approximately 208 microseconds. Thus, with this frame configuration, several multipath signals from each transmitting communication unit might arrive at the base site during one of the Walsh symbol time intervals. Each Walsh symbol time interval generally contains one Walsh symbol of digital information as is known in the art.

To demodulate the transmissions from each communication unit, the base site receiver must first identify the multipath signals from each communication unit and then select the best multipath signals to demodulate. To identify a particular multipath signal, the base site initially receives and stores the information contained in one Walsh symbol. The base site then generates its corresponding PN sequence and correlates it to the PN sequence contained in the signal received at an initial time offset within the Walsh symbol to produce a correlation energy. The initial time offset is typically selected based on the theoretical minimum distance between a communication unit and the base site.

Upon obtaining the first correlation energy, the base site advances to the same offset in the next Walsh symbol and calculates a corresponding correlation energy. This advance and calculate, or search, process continues for a select number of Walsh symbols, typically up to the number contained in a power control group. The number of Walsh symbols to which a particular offset is applied is dependent upon whether the signal being searched for is a traffic signal (i.e., voice or data) or a preamble signal used during the registration of a communication unit in the DS-CDMA system. When the signal being searched for is a traffic signal, the offset is applied to all six Walsh symbols in the power control group; whereas, when the signal being searched for is a preamble signal, the offset is only applied to two Walsh symbols.

Upon applying the initial offset to the appropriate number of Walsh symbols, the base site changes the offset and repeats the procedure until it locates one or more multipath signals that have been transmitted from a communication unit within its service coverage area. Depending on the initial offset and the propagation distances traversed by the communication unit's transmission, the base site typically has to iterate through several offsets before obtaining multipath signals to demodulate. Thus, this search process can often result in high effective demodulation times (i.e., the time to search and subsequently demodulate), especially for received traffic signals. The high effective demodulation times impose an undesired upper limit on the bit energy to noise ratio performance required to maintain a particular received bit error rate. Such a limit prevents the DS-CDMA system from increasing its capacity without degrading the base site's received bit error rate (i.e., signal quality).

Therefore, a need exists for a method and apparatus that identify a particular coded communication signal from a plurality of received coded communication signals, while significantly reducing the search time required to perform the identification. Further, such a method and apparatus that improves the received bit energy to noise ratio for a given bit error rate would be an improvement over the prior art.

BRIEF DESCRIPTION OF THE DRAWINGS

FIG. 4 illustrates exemplary correlation energy levels of multipath signals obtained in a single search window over a power control group in accordance with prior art methodologies.

FIG. 5 illustrates the total correlation energy obtained in the single search window of FIG. 4.

DESCRIPTION OF THE PREFERRED EMBODIMENT

Generally, the present invention encompasses a method and apparatus for identifying a particular coded communication signal from a plurality of received coded communication signals. A receiver that receives coded communication signals comprises a memory means and a processing means. The memory means stores information contained in the received coded communication signals during multiple modulation symbol time intervals to produce stored information. The processing means then searches the stored information to identify the particular coded communication signal. By identifying the particular coded communication signal in this manner, the present invention significantly reduces the average time required to identify one or more multipath signals of the particular received coded communication signal. Thus, the present invention decreases the effective time required for demodulation of the particular coded communication signal as compared to the effective time for demodulation of a coded communication signal using prior art search and demodulate techniques.

Figure 1:
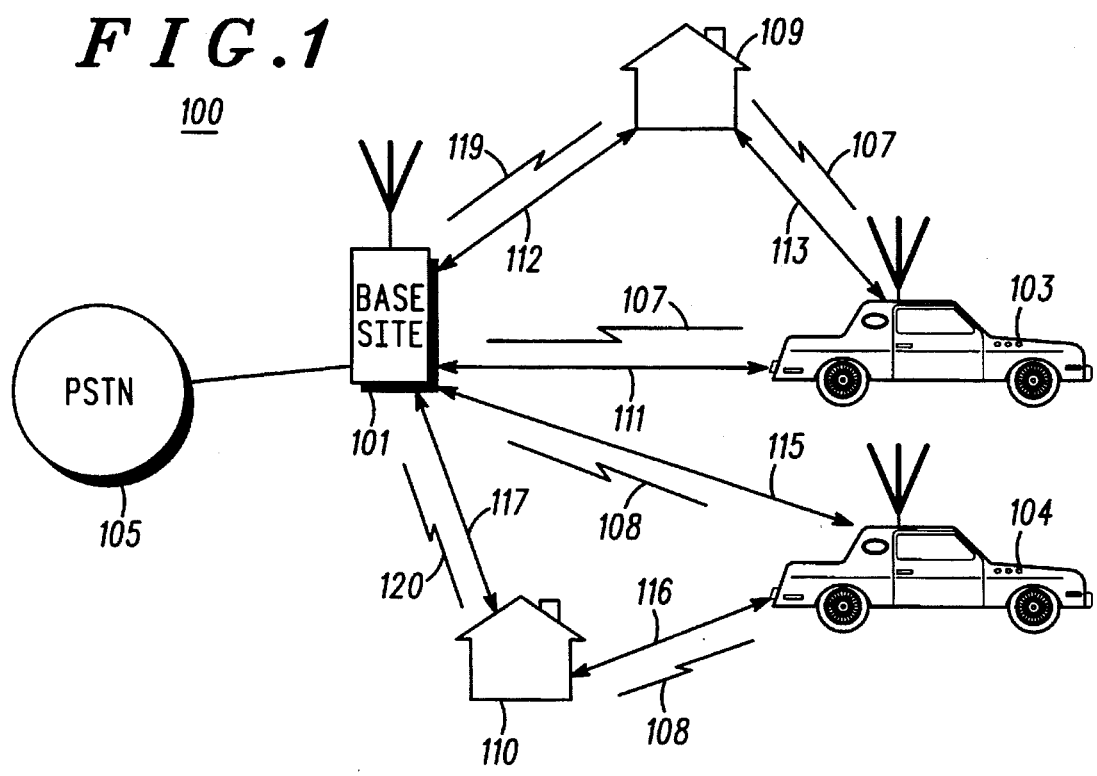
FIG. 1 illustrates a communication system that might employ the present invention.

The present invention can be more fully described with reference to FIGS. 1–11. FIG. 1 illustrates a communication system 100 that might employ the present invention. The communication system 100 includes a base site 101 and one or more communication units 103, 104 (two shown). The communication system 100 preferably comprises a direct sequence code division multiple access (DS-CDMA) cellular communication system, such as that set forth in TIA/EIA IS-95. However, the present invention is equally applicable to a frequency hopping communication system, such as some of those proposed for the domestic Personal Communication System (PCS). In a cellular communication system, the base site 101 is coupled to the public switched telephone network (PSTN) 105 using known techniques.

The base site 101 preferably comprises a receiver that receives coded communication signals from the communication units 103, 104 within a coverage area of the base site 101, a transmitter that transmits coded communication signals to the communication units 103, 104, and the appropriate interfaces between the PSTN 105 and the receiver and transmitter. A preferred base site receiver is discussed in detail below with regard to FIG. 9. Each of the communication units 103, 104 preferably comprises a mobile or portable radiotelephone, a mobile or portable two-way radio, or other two-way communicating device, such as a computer with radio frequency (RF) transmission and reception capabilities.

In the preferred DS-CDMA system 100, the coded communication signals comprise DS-CDMA communication signals 107, 108 that are conveyed between the communication units 103, 104 and the base site 101 through an RF channel. In an alternate frequency hopping communication system, the coded communication signals might comprise slow frequency hopping (SFH) communication signals (multiple modulation symbol time intervals per hop) or fast frequency hopping (FFH) communication signals (multiple hops per modulation symbol time interval). The RF channel includes an uplink (communication units 103, 104 to base site 101) and a downlink (base site 101 to communication units 103, 104). In a preferred embodiment, the uplink comprises a prescribed bandwidth (e.g., 1.25 MHz for IS-95) collectively used by the communication units 103, 104 to transmit multiple coded communication signals 107, 108 (DS-CDMA signals in this case) toward the base site 101. Each DS-CDMA communication signal 107, 108 includes, inter alia, a pseudo-noise sequence associated with the base site 101 and an identification code for the particular communication unit 103, 104.

As described above, movement of each communication unit 103, 104 typically results in fading and multipath propagation of the DS-CDMA communication signals 107, 108—for example, due to reflection of the transmitted signals 107, 108 off of nearby scatterers 109, 110, such as buildings. The fading and multipath propagation phenomena produce multipath signal replicas 119, 120 of the DS-CDMA communication signals 107, 108 transmitted by the communication units 103, 104. Due to the inherent nature of multipath propagation, the transmitted signals 107, 108 and the multipath replicas 119, 120 arrive at the base site 101 at varying times corresponding to the propagation distances 111—113, 115—117 of the transmitted signals 107, 108 and the multipath replicas 119, 120. For example, multipath replica 119 effectively propagates over propagation distances 112 and 113 prior to arriving at the base site 101; whereas, transmitted signal 107 propagates over propagation distance 111. Therefore, when the base site 101 receives the DS-CDMA communication signals 107, 108, 119, 120, it searches the collection of received signals 107, 108, 119, 120 to distinguish each communication unit's transmissions (e.g., 107, 119) from the collection, as later described. Note that in a multipath environment, the transmitted signals 107, 108 together with their respective multipath signal replicas 119, 120 are generally referred to as multipath signals (e.g., 107, 119 and 108, 120) of the transmitted communication signals 107, 108.

Figure 2:
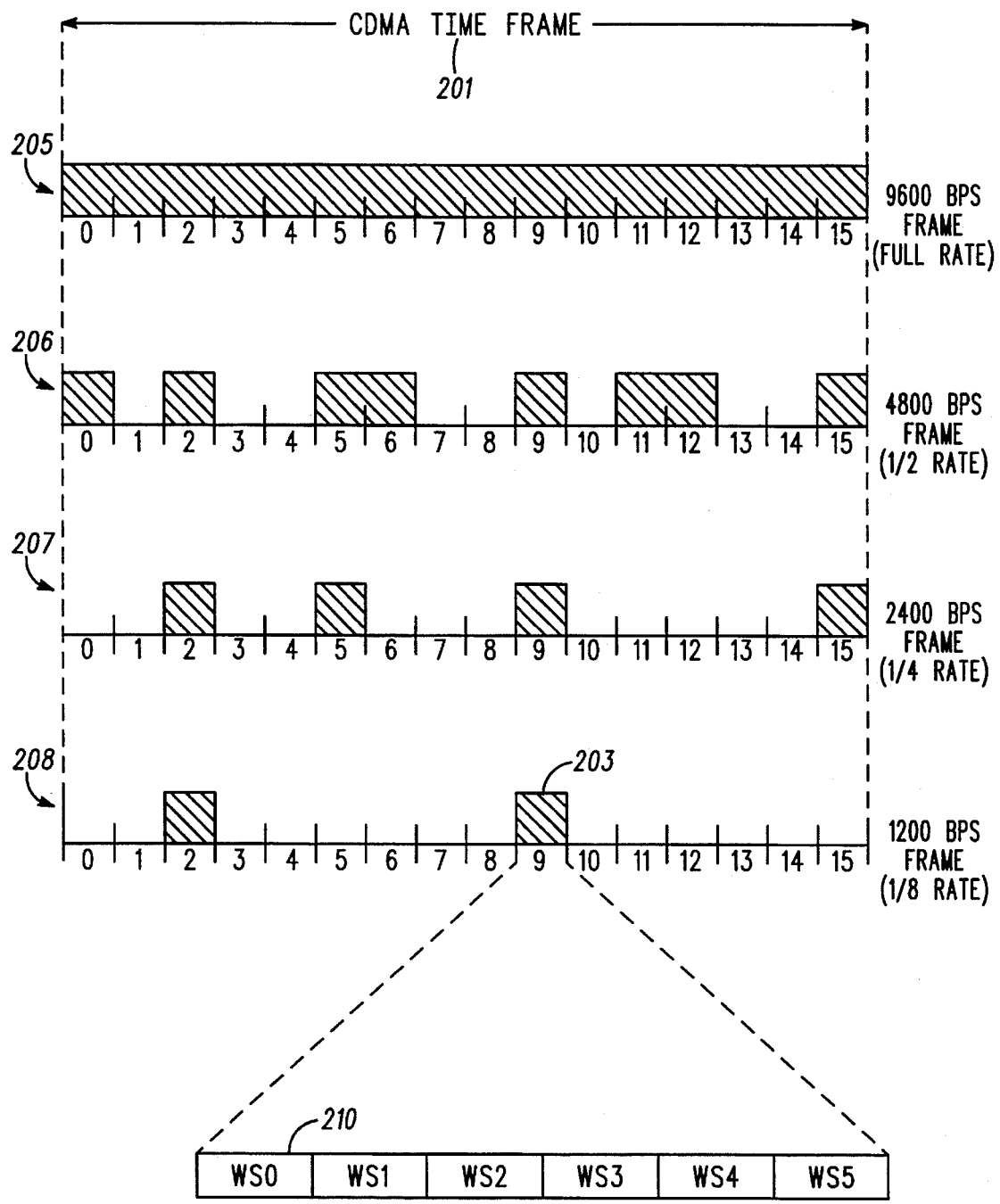
FIG. 2 illustrates the power control groups transmitted by a communication unit at particular CDMA frame rates in accordance with the present invention.

Referring now to FIGS. 2–8, the multipath signals (e.g., 107, 119) of a particular DS-CDMA communication signal 107 received at the base site 101 can be identified in accordance with a preferred embodiment of the present invention in the following manner. During a communication, the communication units 103, 104 collectively transmit their respective DS-CDMA communication signals 107, 108 on the uplink of the RF channel during one or more time frames 201. In a preferred embodiment, each time frame 201 is divided into sixteen power control groups (0–15) of information, wherein each power control group occupies one-sixteenth of the time frame 201 as illustrated in FIG. 2. Each power control group (e.g., 203) is further divided into a plurality of orthogonal symbol sets, such as modulation symbols or Walsh symbols (WS(n)).

In a preferred embodiment, each power control group 203 includes six Walsh symbols (e.g., 210), wherein each Walsh symbol 210 occupies a modulation symbol time interval of approximately 208 microseconds. Each Walsh symbol 210 further comprises 64 Walsh chips or, equivalently, 256 pseudo-noise (PN) chips, wherein each PN chip preferably comprises approximately 813 nanoseconds in accordance with IS-95. Depending on the amount of communication activity (e.g., voice activity), the DS-CDMA communication signals might be transmitted from the communication units 103, 104 using one of four possible frame rates 205–208. For example, full rate transmission 205, which provides for transmission of DS-CDMA communication signals during all sixteen power control groups, might be used while a user of the communication unit 103, 104 is actually conversing, while one-eighth rate transmission 208, which provides for transmission only during power control groups 2 and 9, might be used during periods of substantial silence.

Upon receiving the coded multipath signals 107, 108, 119, 120 from the communication units 103,104, the receiver at the base site 101 stores the information (e.g., digitized voice or data) contained in the received multipath signals 107, 108, 119, 120 during a plurality of modulation symbol time intervals (e.g., Walsh symbols 210). In a preferred embodiment, the receiver stores the information contained in a complete power control group 203. Upon storing the information, the receiver searches the stored information to identify the multipath signals (e.g., 107, 119) associated with a transmission from a particular communication unit 103. In a preferred embodiment, the search is performed sequentially over a plurality of search windows, each search window being offset in time with respect to the previous search window. The searching process is described below with regard to FIGS. 3–8.

Figure 3:
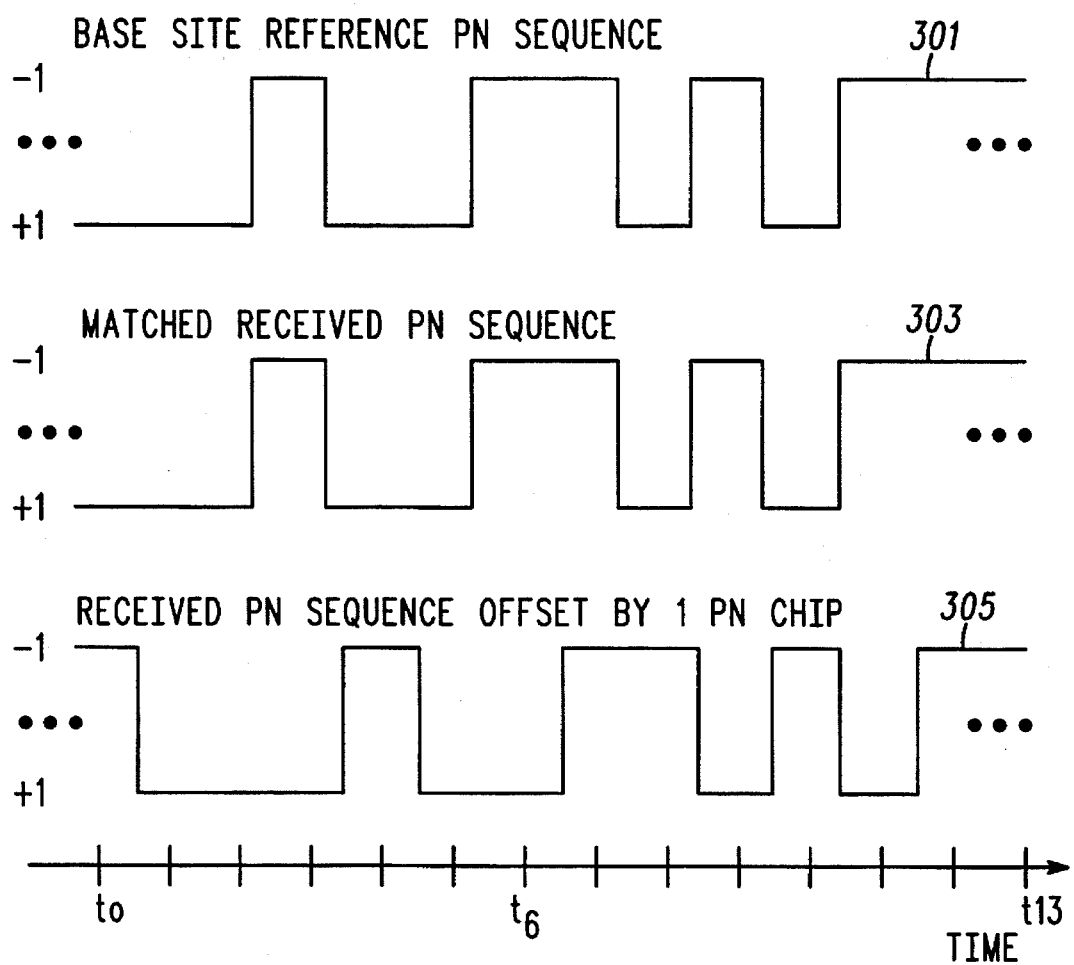
FIG. 3 illustrates reference and received pseudo-noise sequences used to determine associated signal metrics of received multipath signals in accordance with the present invention.

FIG. 3 illustrates reference and received PN sequences 301, 303, 305 used to determine associated signal metrics of the received multipath signals 107, 108, 119, 120 during the aforementioned searching process in accordance with the present invention. The associated signal metrics preferably comprise correlation energies of the received PN sequences 303,305. The correlation energy determination process is initiated by generating a base site reference PN sequence 301 and correlating the reference sequence 301 with the PN sequences (e.g., 303,305) of the multipath signals 107, 108, 119, 120 received at particular offsets in time to obtain correlation energies for the received PN sequences 303,305. The correlation energies are preferably determined by sampling the base site reference PN sequence 301 and the received PN sequences 303,305 at particular sampling times ($t_0$–$t_{13}$) over a predetermined period of time (e.g., a modulation symbol time interval) and computing a corresponding energy at each sampling time. For example, at sampling time $t_6$ the correlation energy between the reference sequence 301 and the matched, or in-phase, received PN sequence 303 is 1 (i.e.,+1×+1), while the correlation energy between the reference PN sequence 301 and the offset received PN sequence 305 is −1 (i.e.,−1×+1).

The correlation energies obtained at the particular sampling times are then summed over the sampling period to obtain the correlation energy for each received PN sequence 303, 305. Thus, for the received PN sequences 303,305 shown in FIG. 3, the correlation energy for the matched PN sequence 303 is 14, while the correlation energy for the PN sequence offset by 1 PN chip 305 is −2. Therefore, when a received PN sequence 305 is offset in time from the reference PN sequence 301, the correlation energy associated with that sequence 305 will be substantially less than the correlation energy for the matched sequence 303.

FIG. 4 illustrates exemplary correlation energy levels 401–406 of multipath signals obtained over a power control group in accordance with prior art methodologies. As shown in FIG. 4 and briefly described in the background section above, the prior art techniques of identifying one or more multipath signals 107, 119 transmitted from a communication unit 103 consist of receiving a first Walsh symbol 210 of information and determining the offset in time 408 associated with the communication unit's theoretical distance with respect to the base site 101. The correlation energy 401 for one of the multipath signals (e.g., 119) received at the offset in time 408 is determined by delaying the reference PN sequence 301 by the offset in time 408 and calculating the correlation energy as described above with regard to FIG. 3.

The receiver at the base site 101 then sequentially determines the correlation energies 402–406 in the remaining Walsh symbols of the power control group as they are received at the base site 101. The subsequent correlation energies 402–406 are determined by advancing the previously determined offset in time 408 by the corresponding modulation symbol time interval (e.g., Walsh symbol). Thus, the prior art approach obtains correlation energies 401–406 in all Walsh symbols of the power control group at the same time offset in each Walsh symbol. Consequently, the search window used to search for multipath signals of a particular transmitted traffic (e.g., voice) signal in the prior art technique comprises a single time offset 408 applied to each Walsh symbol in the power control group.

Upon obtaining all six correlation energies 401–406, the correlation energies 401–406 are summed to accumulate the total correlation energy (501 in FIG. 5) at the chosen offset 408 in the power control group. However, it should be noted that the correlation energies 401–406 obtained over the power control group at the selected time offset 408 may not necessarily provide the highest total correlation energy 501 in each power control group. Therefore, with prior art techniques, the correlation energies 401–406 for multiple offsets (i.e., search windows) might need to be obtained in order to identify a multipath signal of a particular transmitted DS-CDMA communication signal. For example, if the location in time of a multipath signal is such that the correlation energies must be obtained for ten offsets (a typical scenario), then the prior art method would require a search time approximately equal to ten power control groups, or approximately 12.5 milliseconds (ms) for a 20 ms frame time in accordance with IS-95.

Figure 6:
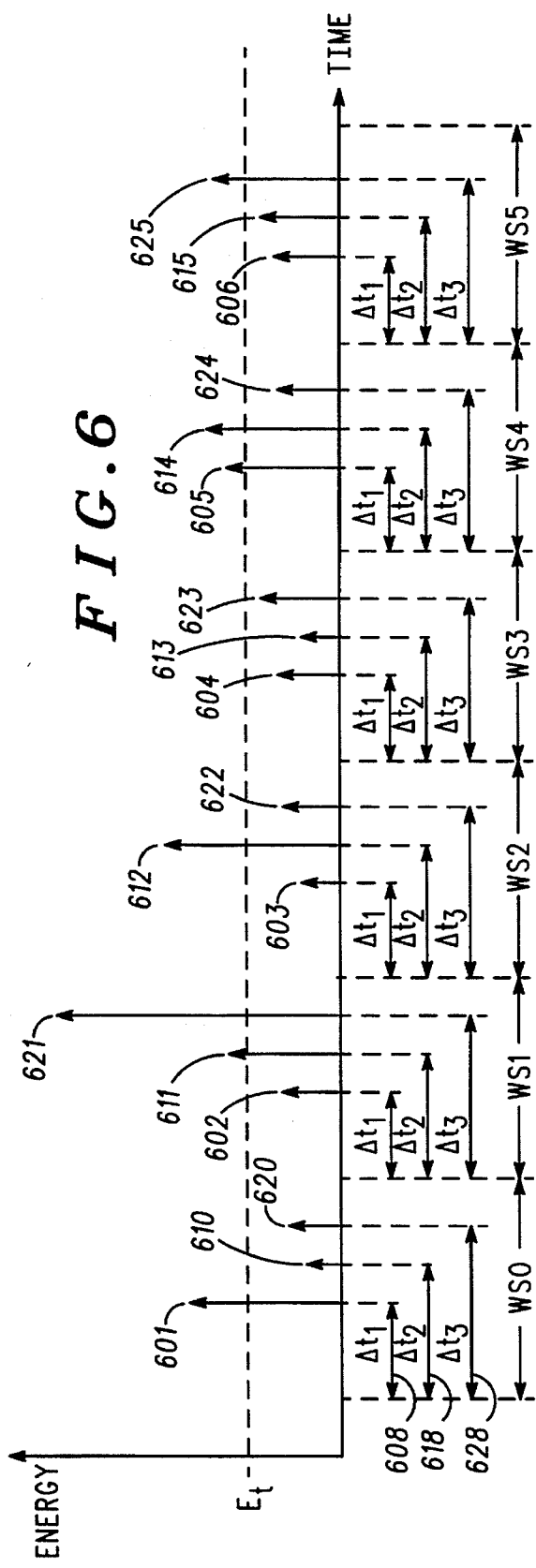
FIG. 6 illustrates exemplary correlation energy levels of multipath signals obtained in multiple search windows over a power control group in accordance with the present invention.
Figure 7:
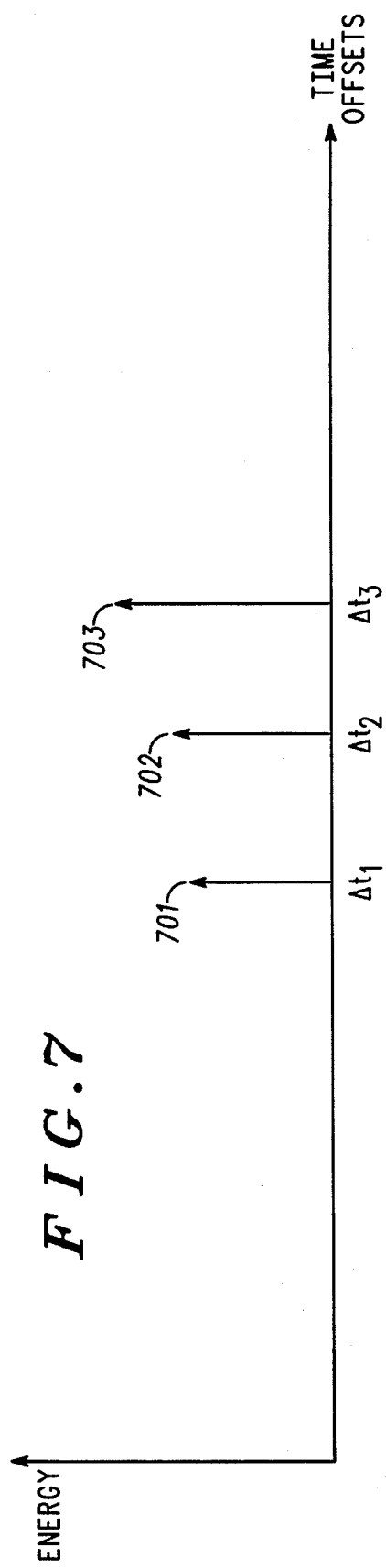
FIG. 7 illustrates the total correlation energies obtained in the multiple search windows of FIG. 6.

FIG. 6 illustrates exemplary correlation energy levels 601–606, 610–615, 620–625 of received multipath signals obtained over a power control group in accordance with the present invention. In contrast to the prior art, the present invention receives and stores the information contained in multiple modulation symbol time intervals (e.g., six Walsh symbols) and searches the multiple modulation symbol time intervals by determining correlation energies for the multiple modulation symbol time intervals at various offsets in time 608, 618, 628. The correlation energies are obtained at each time offset 608, 618, 628 by delaying the base site reference PN sequence by the corresponding offset in time 608, 618, 628 (e.g., by one-half of a PN chip) and calculating the correlation energy (e.g., 601) in each Walsh symbol as described above with regard to FIG. 3.

The correlation energies 601–606, 610–615, 620–625 are accumulated and summed together with the respective correlation energies obtained at corresponding offsets 608,618, 628 to produce the total correlation energies (701–703 in FIG. 7) in multiple search windows (i.e., at multiple offsets 608, 618,628) over the power control group. In a preferred embodiment, only the set of correlation energies that meet or exceed a predetermined threshold ($E_t$) are used to determine the total correlation energies. For example, the total correlation energy 701 in a search window corresponding to offset 608 is determined by summing the correlation energies 601, 605 obtained at that offset 608 over the power control group that meet or exceed the threshold level.

Figure 8:
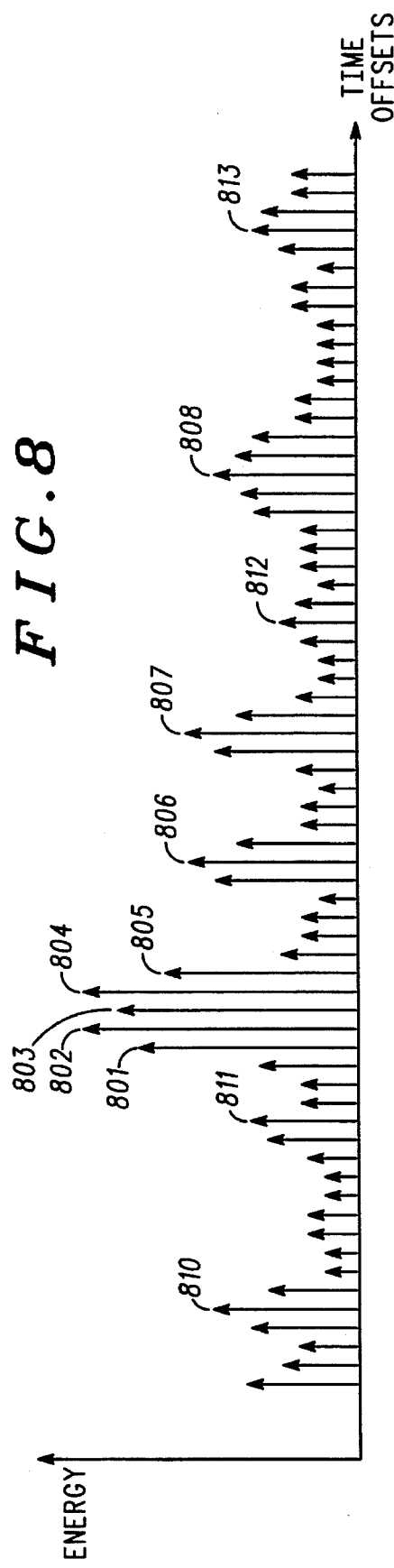
FIG. 8 illustrates total correlation energies obtained in multiple search windows to demonstrate the acquisition of peak energies and local energy maxima in accordance with the present invention.

FIG. 8 illustrates total correlation energies 801–808, 810–813 obtained in multiple search windows to demonstrate the acquisition of peak energies and local energy maxima in accordance with the present invention. After obtaining the total correlation energies 801–808, 810–813 over multiple search windows, a set of the total correlation energies 801–808, 810–813 are selected based on their energy values. In a preferred embodiment, the best eight total correlation energies 801–808 are included in the set and represent the peak energies from the search. The peak energies in the set correspond to the multipath signals received by the receiver at particular time offsets. In addition to identifying the peak energies, the total correlation energies are also used to identify a set of local energy maxima (e.g., 802, 804, 806–808, 810–813 ). Each local energy maximum is preferably determined by selecting the best energy level over a predetermined interval of time (e.g., over three time offsets). The local energy maxima are used to identify possible starting offsets for subsequent searches when the total correlation energy levels at the current offsets degrade due to movement of a transmitting communication unit in a fading environment. In a preferred embodiment, the peak energies and the energies corresponding to the local maxima are processed to obtain the offsets for demodulation.

By using the method of the present invention, the multipath signals received during multiple modulation symbol time intervals can be evaluated over multiple offsets to identify the best offsets from which to demodulate in, at most, the time comprising a power control group (i.e., 1.25 ms per IS-95). Thus, in the ten offset search example provided above with the discussion of FIG. 4, the present invention reduces the prior art search time, and the effective demodulation time, by a factor of more than 10. In addition, the search and demodulate technique of the present invention provides an improved bit energy to noise ratio ($E_b/N_0$) at a particular bit error rate (BER) as compared to its prior art counterparts due to the more expedient identification of the best multipath signals for use in demodulation. This improvement in $E_b/N_0$ is attained because the faster searching process of the present invention reduces the opportunities for acquiring additional noise in the received signals due to fading during the search time. For example, to maintain a received BER of 1%, the method of the present invention requires 0.6 dB less $E_b/N_0$ than does the methods of the prior art. This reduction in required $E_b/N_0$ correlates to an increased system capacity for that BER.

It should be noted that although the above discussion is directed at identifying multipath signals at the base site 101 of uplink transmissions from the communication units 103, 104, the present invention is also applicable in identifying multipath signals at the communication units 103, 104 of downlink transmissions from the base site 101 (e.g., when using transmit diversity techniques at the base site 101 ). It should be further noted that although the preferred embodiment uses energy levels to identify desired offsets for demodulation, the magnitudes of received Walsh symbols might alternatively comprise the associated signal metrics that are used to identify received multipath signals. The procedure for determining the magnitude of a Walsh symbol is known in the art.

Figure 9:
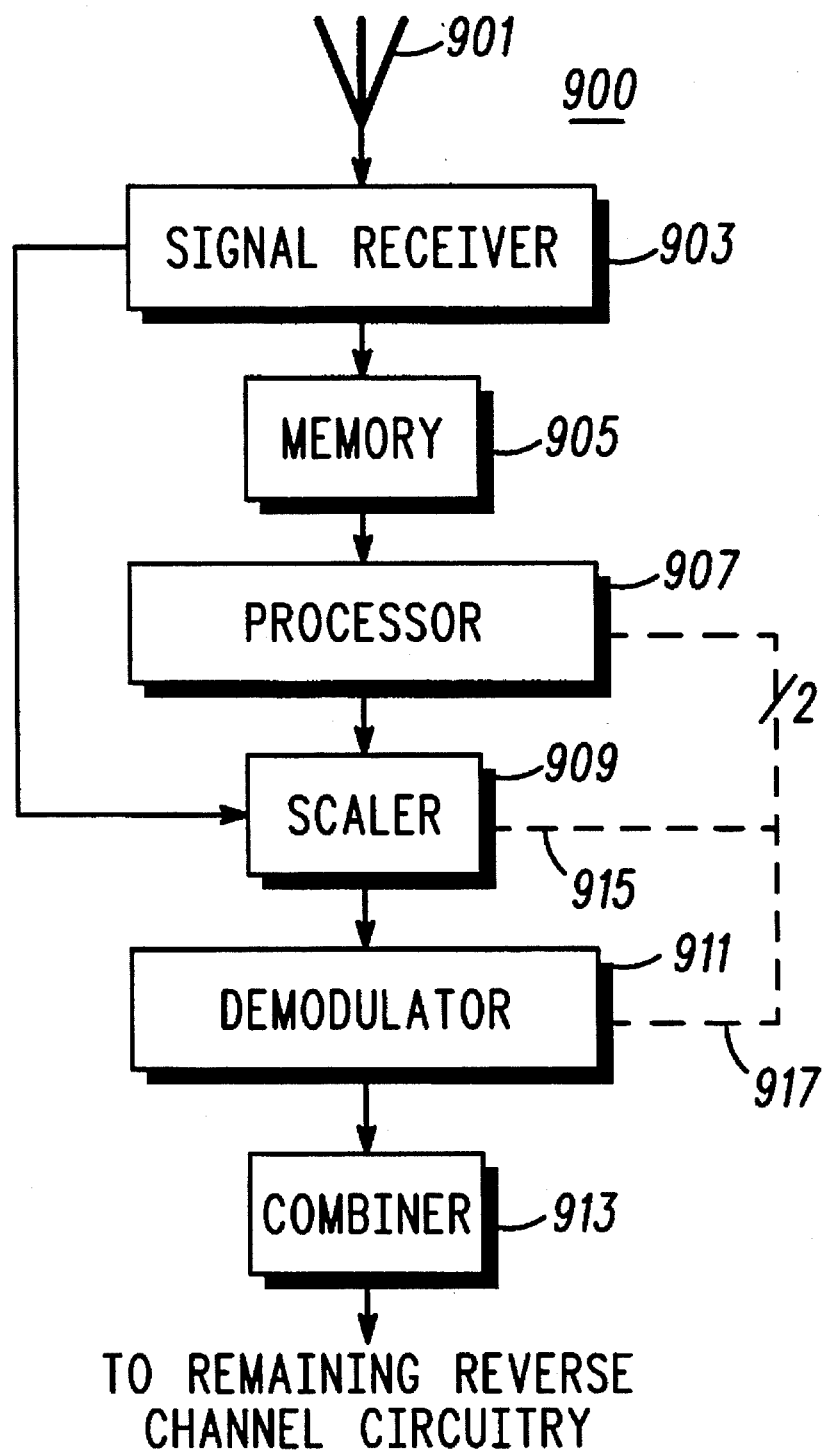
FIG. 9 illustrates a receiver that receives coded communication signals in accordance with the present invention.

FIG. 9 illustrates a receiver 900 that receives coded communication signals in accordance with the present invention. The receiver 900 includes an antenna structure 901, a signal receiver 03, a memory device 905, a processor 907, a scaling device 909, a demodulator 911, and a combiner 913. The antenna structure 901 preferably includes two diversity antennas, although a single antenna may alternatively be used. The signal receiver 903 preferably includes known receiver front end and backend circuitry, such as amplifiers, filters, oscillators, down mixers and analog-to-digital converters. The memory device 905, the processor 907, the scaling device 909, the demodulator 911, and the combiner 9 13 preferably reside in an application specific integrated circuit (ASIC). Preferred embodiments of the memory device 905 and the processor 907 are described in detail below with regard to FIG. 10. The scaling device 909 is coupled to the processor 907 via a control line 915 and preferably comprises a multiplier, a register, and a state machine. The demodulator 911 is also coupled to the processor 907 via a control line 917 and preferably comprises known digital hardware associated with performing a Fast Hadamard Transform (FHT).

Operation of the receiver 900 in accordance with the present invention occurs in the following manner. The multipath signals are received by the antenna structure 901 and subsequently supplied to the signal receiver 903. The signal receiver 903 processes the received signals and preferably supplies a power control group of sampled baseband representations of the received signals to the memory device 905. The memory device 905 stores the information contained in the baseband representations during two or more modulation symbol time intervals as described above with regard to FIG. 2. The memory device 905 then provides the stored information to the processor 907 where the stored information is searched to obtain the time offsets and energies associated with the received multipath signals as described above. Detailed operation of the processor is provided below with regard to FIG. 10.

In addition to supplying baseband representations to the memory device 905, the signal receiver 903 also despreads the coded communication signals based on the time offsets supplied by the processor 907 to extract the 64 Walsh chips contained in each Walsh symbol. The signal receiver 903 provides the despread signals (Walsh chips) to the scaler 909. The scaler 909 weights each despread multipath signal based on the total correlation energy obtained in a corresponding search window. The scaler 909 then provides the weighted despread multipath signals to the demodulator 911 where each despread signal is demodulated and subsequently provided to the combiner 913. The combiner 913 combines the demodulated multipath signals in accordance with known techniques to recover the particular coded communication signal associated with the received multipath signals. The combiner 913 supplies the recovered coded communication signal to the remaining reverse channel circuitry (e.g., soft decision circuitry, convolutional decoder, etc.) for further processing. In a preferred embodiment the scaler 909 is not used and the despread signals are provided from the signal receiver 903 directly to the demodulator 911.

Figure 10:
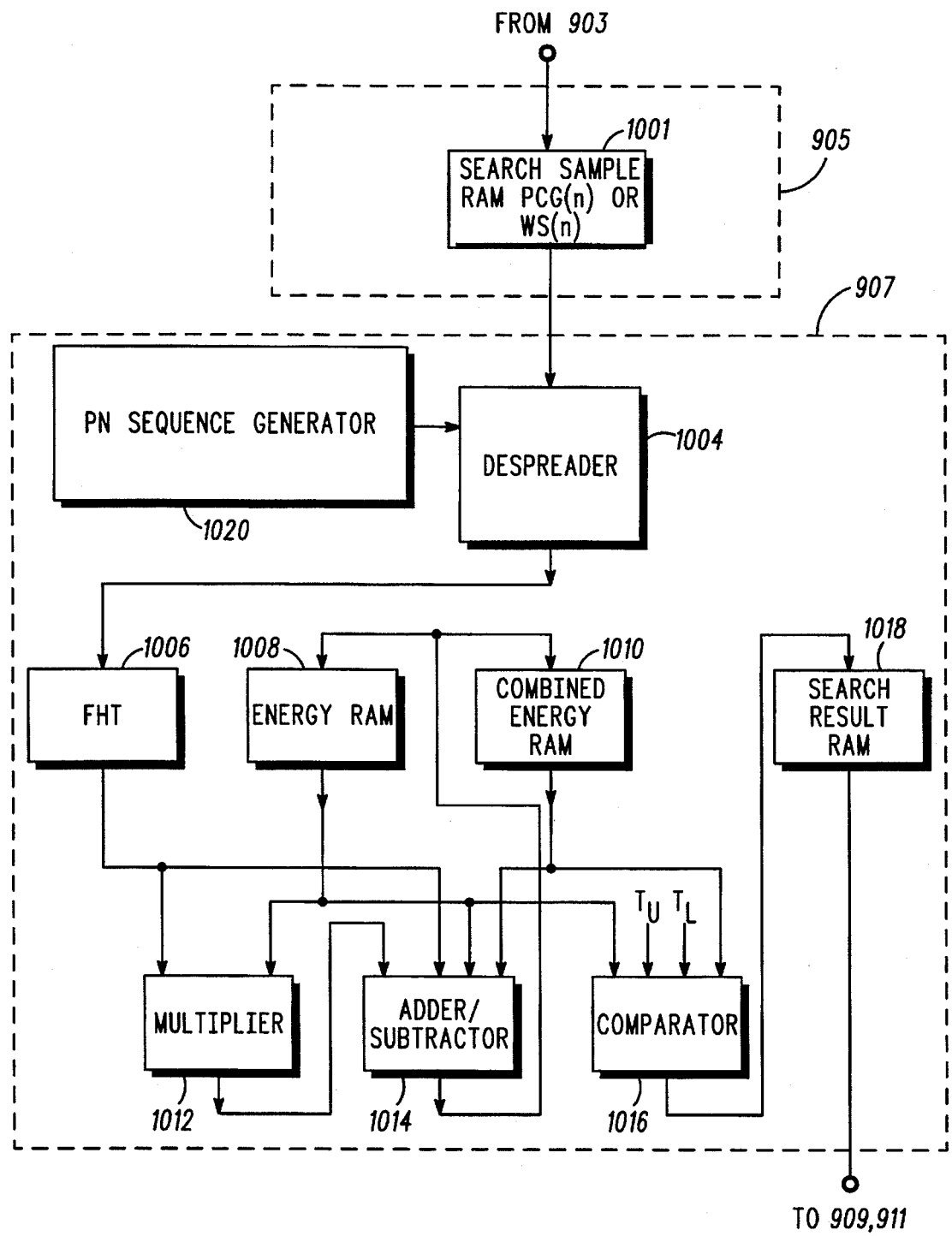
FIG. 10 illustrates preferred embodiments of the memory device and the processor included in the receiver of FIG. 9.

FIG. 10 illustrates preferred embodiments of the memory device 905 and the processor 907 included in the receiver 900 of FIG. 9. In the preferred embodiment, the memory device 905 comprises a random access memory 1001 (RAM) used to store the information contained in one or more power control groups (PCG(n)) or two or more Walsh symbols. However, the memory device 905 might alternatively comprise a register file, an array of latches, or any other means for storing digital information. The preferred processor 907 includes a despreader 1004, an FHT block 1006, an energy RAM 1008, a combined energy RAM 1010, a multiplier 1012, an adder/subtractor 1014, a comparator 1016, a search result RAM 1018, and a PN sequence generator 1020.

Operation of the preferred memory device 905 and the preferred processor 907 occurs in the following manner. The sampled baseband representations of the multipath signals provided by the signal receiver 903 to the memory device 905 are stored in the RAM 1001. The RAM 1001 provides an equivalent amount of the sampled representations as is contained in a Walsh symbol to the despreader 1004. The despreader 1004 also receives a reference PN sequence (e.g., the reference sequence of FIG. 3) from the PN sequence generator 1020 and uses the reference PN sequence in a known manner to obtain the 64 Walsh chips that comprise the inputted Walsh symbol. In a preferred embodiment, each Walsh symbol corresponds to an in-phase (I) component or a quadrature (Q) component of a digitally modulated M-ary signal.

The Walsh chips are provided to the FHT block 1006 where they are demodulated using the aforementioned FHT. The FHT block 1006 effectively transforms the inputted Walsh chips (either I or Q) into a table of indexed magnitudes having associated signs (i.e., either positive or negative) that depend on, inter alia, the signs of the originally transmitted digital information and characteristics of the RF channel. The indexes correspond to the code symbols used for a particular encoding/decoding configuration as is known in the art.

The FHT block 1006 provides the Walsh chips sequentially to the multiplier 1012. The multiplier 1012 squares each indexed magnitude and provides the squared magnitudes to the adder/subtractor 1014. When using M-ary digital modulation, the multiplier 1012 preferably computes $I^2$ for each index (i.e., $I_1^2$, $I_2^2$, $I_3^2$, etc.) in the output table of the FHT block 1006 and provides these squared magnitudes to the adder/subtractor 1014. The adder/subtractor 1014 passes the $I^2$ values to the energy RAM 1008 where they are stored. Subsequent to computing the $I^2$ values, the multiplier 1012 squares each indexed magnitude for the Walsh chips associated with the Q component. As each $Q_i^2$ is produced by the multiplier 1012 and provided to the adder/subtractor 1014, the energy RAM 1008 provides a corresponding $I_i^2$ value to the adder/subtractor 1014. The adder/subtractor 1014 adds the corresponding $I^2$ and $Q^2$ values and sequentially provides the summations ($I_i^2+Q_i^2$) to the energy RAM 1008 where the summations, or energies, are stored until all 64 have been computed.

The energy RAM 1008 provides the stored energies to the comparator 1016 where the energies are sequentially compared to each other to identify the index having the highest associated energy (i.e., correlation energy) for the particular offset. This first correlation energy is then compared to upper and lower thresholds ($T_u$, $T_l$). When the first correlation energy is less than the lower threshold ($T_l$, the energy is ignored (i.e., weighted by zero) and the remaining search at that offset is discontinued. When the first correlation energy level resides between the upper and lower thresholds, the energy is stored in the combined energy RAM 1010 and the search is allowed to continue at that offset for the remaining Walsh symbols in the power control group. When the first correlation energy level exceeds the upper threshold ($T_u$), the energy level is stored in the combined energy RAM 1010 and the offset at which the energy was obtained is then provided to the scaler 909 and/or the demodulator 911 for further processing of the multipath signal received at that offset.

Upon obtaining the first correlation energy, the above process is repeated for each offset in each Walsh symbol until all the Walsh symbols of the stored power control group have been searched. However, during these repeated processes, the correlation energies obtained at corresponding offsets are accumulated and compared to updated upper and lower thresholds. For example, when the correlation energies are accumulated for a particular offset over three Walsh symbols, the accumulated energy (i.e., the sum of the three correlation energies) is compared to upper and lower thresholds that are approximately three times higher than those which were compared to the first correlation energy. The cumulation of this iterative procedure effectively results in the summing of the correlation energies shown in FIG. 6, thereby obtaining the total correlation energies depicted in FIGS. 7 and 8. These total correlation energies are then stored in the combined energy RAM 1010.

The combined energy RAM 1010 provides the total correlation energies to the comparator 1016 where they are compared to each other to determine a set of total correlation energies having energy values greater than the total correlation energies not in the set. In the preferred embodiment, the eight highest total correlation energies are included in the set. As described above with regard to FIG. 8, the total correlation energies in the set correspond to the multipath signals received by the receiver 900 at respective time offsets. In addition to determining the offsets corresponding to the greatest eight energies, the comparator 1016 also determines a set of local maxima of the total correlation energies and identifies the offsets associated with those maxima as described above with regard to FIG. 8. The set of total correlation energies, the set of local maxima, and the offsets associated with both sets are provided to the search result RAM 1018 where they are stored and subsequently used for controlling the processing performed by the scaler 909 and/or the demodulator 911.

The above iterative process exemplifies a preferred non-coherent demodulation approach used to identify the offsets from which to process the received multipath signals. However, the use of a coherent demodulation technique during the searching process is equally applicable to the present invention. The coherent demodulation process preferably occurs as follows. The FHT block 1006 receives the I and Q Walsh chips in a manner similar to that described above for the non-coherent demodulation approach. The FHT block 1006 then provides the I and Q Walsh chips of the first Walsh symbol in the power control group to the adder/subtractor 1014. The adder/subtractor 1014 passes these I and Q values to the energy RAM 1008 where they are stored. The FHT block 1006 then provides the I and Q Walsh chips of the subsequent Walsh symbol, or symbols—depending on the number of modulation symbol time intervals stored in the RAM 1001—to the adder/subtractor 1014. The adder/subtractor 1014 adds the respective I values corresponding to all 64 indexes of all the Walsh symbols stored in the energy RAM 1008 (e.g., $I_1[WS(0)]+I_1[WS(1)]+I_1[WS(2)]+\ldots$; $I_2[WS(0)]+I_2[WS(1)]+I_2[WS(2)]+\ldots$; etc.). In a similar manner, the adder/subtractor 1014 adds the respective Q values corresponding to all 64 indexes of all the Walsh symbols stored in the energy RAM 1008. The 64 summed I values ($[\Sigma I]$) and the 64 summed Q values ($[\Sigma Q]$) are then provided to the multiplier 1012.

The multiplier 1012 squares each summed I value and each summed Q value, and provides the squared magnitudes ($[\Sigma I]^2$, $[\Sigma Q]^2$) to the adder/subtractor 1014. The adder/subtractor 1014 adds the corresponding $[\Sigma I]^2$ and $[\Sigma Q]^2$ values and sequentially provides the summations ($[\Sigma I_i]^2 + [\Sigma \Sigma Q_i]^2$) to the energy RAM 1008 where the summations, or energies, are stored until all 64 have been computed. The energies are provided to the comparator 1016 for further processing in a manner analogous to that described above with regard to non-coherent demodulation. It should be noted that the techniques described hereinabove for non-coherent and coherent demodulation can also be applied to the final demodulation performed by the demodulator 911 of FIG. 9.

Figure 11:
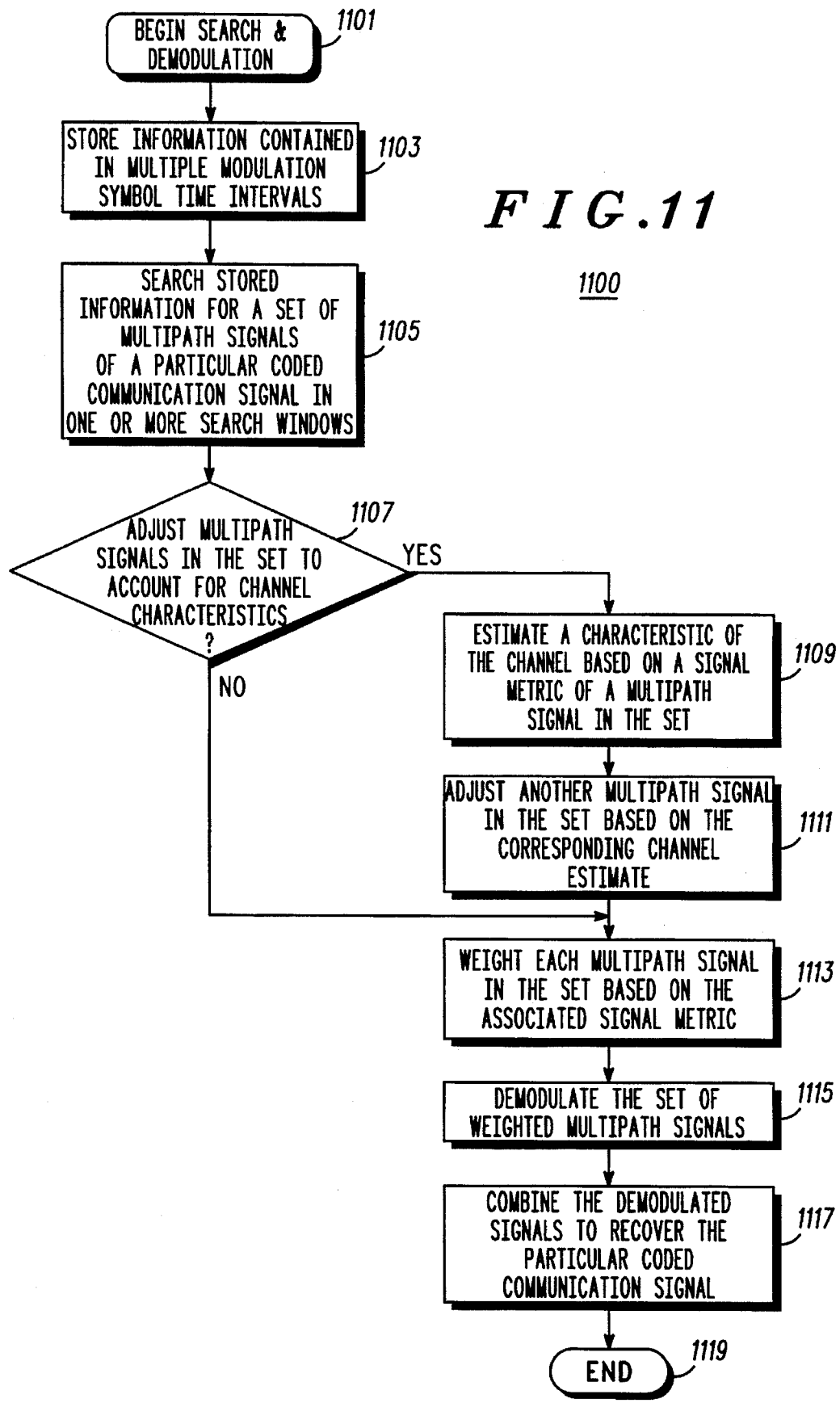
FIG. 11 illustrates an exemplary logic flow diagram of steps executed by a receiver in accordance with the present invention.

FIG. 11 illustrates an exemplary logic flow diagram 1100 of steps executed by a receiver in accordance with the present invention. The logic flow begins (1101) when the receiver stores (1103) information contained in multiple modulation symbol time intervals. The receiver then searches (1105) the stored information to identify a set of multipath signals of a particular coded communication signal in one or more search windows (i.e., at one or more time offsets in each modulation symbol time interval) by determining the total correlation energy in each search window as described above. In a preferred embodiment, the set of multipath signals are those signals received at the offsets that provide the eight best total correlation energies.

Upon searching the stored information and determining the set of multipath signals, the receiver determines (1107) whether the multipath signals in the set need to be adjusted to account for characteristics of the complex RF channel through which the multipath signals propagated prior to reception. Such characteristics include phase rotation or attenuation of the multipath signals' modulation symbols due to fading. When the multipath signals in the set need to be adjusted, the receiver estimates (1109) a characteristic of the channel based on an associated signal metric of a multipath signal in the set. For example, to account for a phase rotation of the modulation symbols during transmission through the RF channel, the I and Q components of an M-ary modulation symbol that provide the correlation energy for a particular time offset might be used to determine a desired phase in the I, Q plane at that time offset for the remaining stored modulation symbols.

Upon estimating the characteristic of the channel, the receiver adjusts (1111) one or more multipath signals in the set based on the corresponding channel estimate. In the above example, this adjusting might comprise rotating the phase of a subsequent stored modulation symbol such that the phase corresponds to the previously determined desired phase.

Continuing down the logic flow diagram 1100, the receiver weights (1113) each multipath signal in the set based on the associated signal metric. In a preferred embodiment, the weightings are determined in proportion to the correlation energy computed for each multipath signal and are applied to the magnitudes of each of the multipath signals. Upon weighting each multipath signal in the set, the receiver demodulates (1115) the set of weighted multipath signals by preferably applying an FHT to each weighted multipath signal. The receiver then combines (1117) the demodulated signals using known combining techniques to recover the particular coded communication signal and the logic flow ends (1119).

The present invention encompasses a method and apparatus for identifying a particular coded communication signal from a plurality of received coded communication signals. With this invention, the time required to search and identify the best multipath signals of the particular coded communication signal to use for demodulation is significantly reduced as compared to the prior art searching techniques. This search time improvement results because the present invention provides a means for acquiring energies at multiple offsets over a power control group; whereas, the prior art approaches only acquire a single energy (i.e., one offset) over the power control group. Thus, the present invention more efficiently utilizes the data contained in a power control group during its multipath signal search as compared to the data utilization of the prior art searching techniques. Further, due to its expedient searching performance, the present invention provides an improved $E_b/N_0$ at a particular bit error rate as compared to its prior art counterparts since faster searching results in reduced opportunities for acquiring additional noise in the received multipath signals due to fading during the total search time interval.

What is claimed is:

1. In a receiver that receives a spread spectrum signal, a method for identifying a particular coded communication signal, the method comprising the steps of:

dividing the spread spectrum signal into a plurality of modulated time intervals;

storing information contained in each of the plurality of modulated time intervals;

determining a first correlation metric for each of the plurality of modulated time intervals at a first offset in time; and determining a second correlation metric for each of the plurality of modulated time intervals at a second offset in time.

2. The method of claim 1, wherein the particular coded communication signal comprises a code division multiple access signal.

3. The method of claim 1, wherein the particular coded communication signal comprises a frequency hopping communication signal.

4. The method of claim 1, further comprising comparing each of the first and second correlation metrics to a threshold.

5. The method of claim 4, wherein the first correlation metric comprises one of an energy and a magnitude measurement.

6. The method of claim 1, further comprising identifying the particular coded communication signal based on the correlation metrics.

7. The method of claim 6, further comprising the steps of:

identifying a set of multipath signals of the particular coded communication signal;

weighting each multipath signal in the set of multipath signals based on the correlation metrics to produce a set of weighted multipath signals;

demodulating the set of weighted multipath signals to produce a set of demodulated multipath signals; and combining the set of demodulated multipath signals to recover the particular coded communication signal.

8. The method of claim 6, wherein the particular coded communication signal propagates through a complex channel prior to reception by the receiver.

9. The method of claim 8, further comprising the step of adjusting a second multipath signal in the set of multipath signals based on a channel estimate to produce an adjusted multipath signal.

10. The method of claim 9, further comprising the step of demodulating the adjusted multipath signal.

11. The method of claim 6, further comprising the step of coherently demodulating the particular coded communication signal.

12. The method of claim 6, further comprising the step of non-coherently demodulating the particular coded communication signal.

13. The method of claim 1, further comprising the steps of:

performing a first search of the stored information in a first search window; and performing a second search of the stored information in a second search window, the second search window being offset in time from the first search window.

14. The method of claim 1, wherein the spread spectrum signal includes a plurality of orthogonal symbol sets.

15. The method of claim 14, wherein at least two of the plurality of orthogonal symbols sets comprise a power control group.

16. The method of claim 14, wherein each of the plurality of orthogonal symbol sets comprises a modulation symbol.

17. The method of claim 16, wherein the modulation symbol comprises a Walsh symbol.

18. In a receiver that receives direct sequence code division multiple access (DS-CDMA) signals, each of the DS-CDMA signals including a plurality of Walsh symbols, a method for identifying a particular DS-CDMA signal from a plurality of received DS-CDMA signals, the method comprising the steps of:

a) storing information contained in the plurality of received DS-CDMA signals to produce stored information;

b) searching the stored information to identify a set of multipath signals of the particular DS-CDMA signal, each multipath signal in the set of multipath signals having an associated signal metric greater than an associated signal metric of any multipath signal of the particular DS-CDMA signal not in the set of multipath signals, each of the associated signal metrics based on a first measurement for each of the Walsh symbols at a first time offset and a second measurement for each of the Walsh symbols at a second time offset;

c) demodulating the set of multipath signals to produce a set of demodulated multipath signals; and d) combining the set of demodulated multipath signals to recover the particular DS-CDMA signal.

19. The method of claim 18, wherein each of the associated signal metrics comprises an energy or magnitude metric.

20. The method of claim 18, wherein each of the plurality of Walsh symbols includes a plurality of pseudo-noise chips and wherein the step of searching comprises the steps of:

b1) performing a first search of the stored information in a first search window; and b2) performing a second search of the stored information in a second search window, the second search window being offset in time from the first search window by at least a portion of one of the plurality of pseudo-noise chips.

21. A receiver for receiving a plurality of coded communication signals, the receiver comprising:

memory means for storing information contained in the plurality of received coded communication signals during a plurality of modulation symbol time intervals to produce stored information; and processing means, operably coupled to the memory means, for determining a first correlation and a second correlation of the modulation symbol time intervals at a respective first time offset and second time offset for identifying a particular coded communication signal based on the first and second correlations.

22. The receiver of claim 21, further comprising demodulating means, operably coupled to the processing means, for demodulating the particular coded communication signal.

23. The receiver of claim 21, wherein the processing means comprises means for performing a first search and determining the first correlation of the stored information in a first search window and means for performing a second search and determining the second correlation of the stored information in a second search window, the second search window being offset in time from the first search window.

24. The receiver of claim 21, wherein the processing means comprises means for searching the stored information to identify a set of multipath signals of the particular coded communication signal, wherein each multipath signal in the set of multipath signals has an associated signal metric greater than an associated signal metric of any multipath signal of the particular coded communication signal not in the set of multipath signals, each of the associated signal metrics based on the first and second correlations.

25. The receiver of claim 24, wherein each of the associated signal metrics comprises an energy or magnitude metric.

26. The receiver of claim 24, further comprising:

scaling means, operably coupled to the processing means, for weighting each multipath signal in the set of multipath signals to produce a set of weighted multipath signals;

demodulating means, operably coupled to the scaling means, for demodulating the set of weighted multipath signals to produce a set of demodulated signals; and combining means, operably coupled to the demodulating means, for combining the set of demodulated signals to recover the particular coded communication signal.

27. The receiver of claim 21, wherein the processing means comprises means for searching the stores information to identify to identify a set multipath signals of the particular coded communication signal, wherein each multipath signal in the set of multipath signals has an associated signal metric exceeding a threshold, the associated signal metric based on the first and second correlations.

28. The receiver of claim 21, wherein each of the plurality of coded communication signals includes a plurality of orthogonal symbol sets and wherein the memory means comprises means for storing information contained in a plurality of received orthogonal symbol sets to produce the stored information.

29. The receiver of claim 28, wherein at least two of the plurality of orthogonal symbol sets comprise a power control group, and wherein the processing means comprises means for searching the stored information contained in the power control group to identify the particular coded communication signal.

30. A receiver for receiving direct sequence code division multiple access (DS-CDMA) signals, each of the DS-CDMA signals including a plurality of Walsh symbols, the receiver comprising:

a memory device for storing information contained in the DS-CDMA signals to produce stored information;

a processor, operably coupled to the memory device, the processor searching the stored information to identify a set of multipath signals of a particular DS-CDMA signal, each multipath signal in the set of multipath signals having an associated signal metric greater than an associated signal metric of any multipath signal of the particular DS-CDMA signal not in the set of multipath signals, each of the associated signal metrics based on a first correlation and second correlation of at least one of the Walsh symbols at a respective first time offset and second time offset;

a demodulator, operably coupled to the processor, for demodulating the set of multipath signals to produce demodulated multipath signals; and a combiner, operably coupled to the demodulator, for combining the demodulated multipath signals to recover the particular DS-CDMA signal.

31. The receiver of claim 30, wherein the processor comprises:

a pseudo-noise sequence generator for producing a reference pseudo-noise sequence;

a despreader, operably coupled to the pseudo-noise sequence generator, for despreading each of the plurality of Walsh symbols of a multipath signal in the set of multipath signals into a plurality of in-phase Walsh chips and a plurality of quadrature Walsh chips based on the reference pseudo-noise sequence;

a transform device, operably coupled to the despreader, for transforming the plurality of in-phase Walsh chips into a first set of indexed magnitudes and for transforming the plurality of quadrature Walsh chips into a second set of indexed magnitudes;

a multiplier, operably coupled to the transform device, for squaring each indexed magnitude in the first set of indexed magnitudes to produce the first correlation comprising a first set of energies and for squaring each indexed magnitude in the second set of indexed magnitudes to produce the second correlation comprising a second set of energies;

an adder, operably coupled to the multiplier, for summing each energy in the first set of energies with a corresponding energy in the second set of energies to produce a set of summed energies; and a comparator, operably coupled to the adder, for selecting an energy that is highest in the set of summed energies to produce a composite correlation energy for the multipath signal.

* * * * *

UNITED STATES PATENT AND TRADEMARK OFFICE
CERTIFICATE OF CORRECTION

PATENT NO. : 5,530,716
DATED     : June 25, 1996
INVENTOR(S) : Lipa, Robert A.

It is certified that error appears in the above-indentified patent and that said Letters Patent is hereby corrected as shown below:

At Column 14, line 29, "searching the stores" should be --searching the stored--.

Signed and Sealed this

Twenty-fourth Day of September, 1996

Attest:

BRUCE LEHMAN

Attesting Officer          Commissioner of Patents and Trademarks